UNITED STATES PATENT OFFICE.

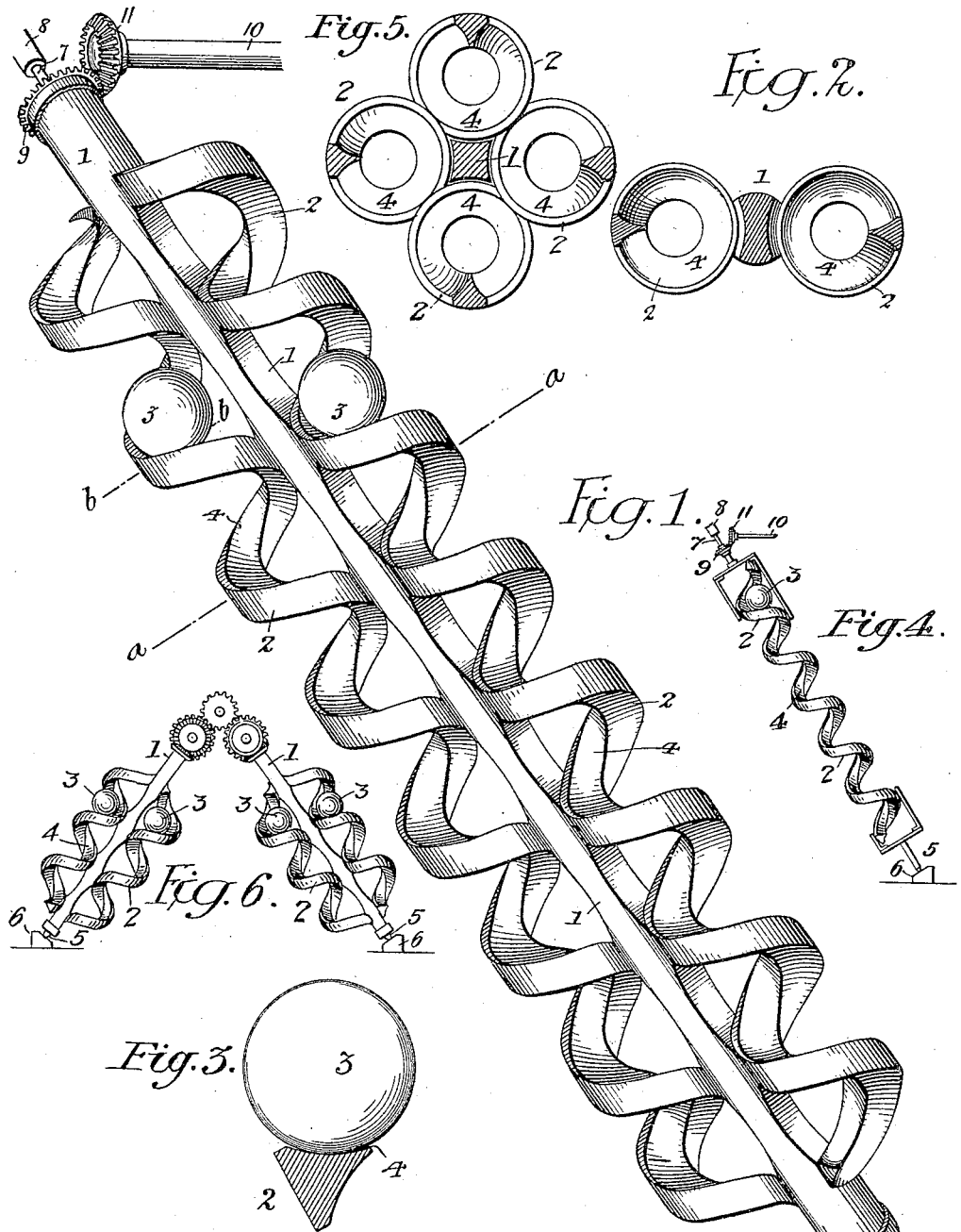

CHARLES DACKIEWICZ, OF PHILADELPHIA, PENNSYLVANIA, ASSIGNOR OF FIFTY-ONE ONE-HUNDREDTHS TO CHARLES FREIHOFER AND FREDERICK HANSON, OF PHILADELPHIA, PENNSYLVANIA.

MECHANICAL MOTOR.

No. 816,437.      Specification of Letters Patent.      Patented March 27, 1906.

Application filed October 31, 1904. Serial No. 230,740.

*To all whom it may concern:*

Be it known that I, CHARLES DACKIEWICZ, a citizen of the United States, residing in Philadelphia, Pennsylvania, have invented a Mechanical Motor, of which the following is a specification.

My invention, comprising an improved mechanical motor, consists of an apparatus in which the weight of a falling body arranged to follow a helical guide or track is utilized to transmit rotative movement to a shaft.

My invention is fully shown in the accompanying drawings, in which—

Figure 1 is a perspective view of a structure embodying my invention. Fig. 2 is a sectional view taken on the line *a a*, Fig. 1. Fig. 3 is an enlarged sectional view taken on the line *b b*, Fig. 1; and Figs. 4, 5, and 6 are views illustrating modifications of my invention.

This device has been employed as a motor for operating clock-movements, although it may be used as a prime mover for operating other mechanical structures. The arrangement of the apparatus is such that motion will be maintained for a long time, the pitch of the helical guides or tracks, the angle at which they are disposed, and the weights being so proportioned that the rotative movement is comparatively slow.

In the accompanying drawings, 1 represents the central stem of the motor structure having on opposite sides helical guides or tracks 2, so disposed as to cause the round bodies 3, arranged on the same, to travel toward the center of rotation, such bodies in turn causing the track-carrying structure to rotate. The tracks are of uniform pitch, the internal diameter of each one being the same, and the surface receiving and supporting the spherical weighted bodies is concaved, as clearly shown at 4 in Fig. 3. The lower end 5 of the central stem may be pointed, as shown, to reduce friction as it rotates and is mounted in a step-bearing 6. The upper end 7 of the central stem is mounted in a bearing 8 and is provided with a bevel-wheel 9, whereby the rotative movement of said stem may be transmitted to the point of use. In the present instance I have shown a shaft 10, suitably mounted and having a bevel-pinion 11, meshing with the bevel-wheel 9.

The helical tracks 2, disposed on opposite sides of the central stem 1, have portions in engagement with said stem in a plane at right angles to the line drawn through the axis of rotation, the balls being disposed in a horizontal plane. It will be observed, however, that such arrangement is not essential, as no matter where the convolutions of the helical track may be the balls will always find a point of relative rest in a horizontal plane.

To rotate the central stem 1, the weights 3 are provided, indicated in the drawings as being within the helical guides or tracks, which are disposed on opposite sides of said central stem, and these weights are preferably spherical, so that they may follow the helical tracks with the least resistance. Owing to the weights carried thereby and being supported at an angle, the stem carrying the helical tracks has a constant tendency to turn or rotate, and this movement, acting through the gears 9 and 11, causes the shaft 10 to rotate. As the track-carrying structure rotates the portions of the tracks immediately supporting the balls tend to maintain a horizontal position, said tracks being concaved so that the balls can always find a point of rest, and in consequence said balls are constantly changing their position with relation to said helical tracks as the latter turn or move with the central stem on the axis of rotation. As said weights move along these tracks the pitch of the latter tends to alter the point of application of their weight, so that each ball moves in one direction, and under the influence of the force of gravity they act against the helical tracks and rotate the central stem carrying the same. The movement of this structure is relatively very slow and permits the balls to alter their position so gradually that they are never displaced and gradually reach the bottom of the helical path or track, driving with uniform regularity said track-carrying structure and through it the clock escapement or other apparatus. The structure shown in the drawings herewith is relatively small, and in practice helical guides or tracks having three or four times the number of turns would be employed. The weights would therefore require a longer time to reach the bottom of the tracks and the rotation of the stem 1 would be correspondingly increased. The angle at which the stem carrying the helical tracks is disposed determines the speed of rotation, and in order that this speed may be as slow as possible the stem 1 should be arranged at as small an angle to the horizontal as will maintain the speed desired.

While I have shown a central stem having a pair of helical guides or tracks, it will be understood that I may employ a single helical guide or track, as shown in Fig. 4, or more than two disposed around a central stem, as shown in Fig. 5, either structure having the spherical weight or weights and operating in precisely the same manner as the structure shown and described herewith, and in some instances I may dispose a pair of helical tracks at an angle to each other, as shown in Fig. 6, having means whereby their independent movement may be transmitted to a single shaft. A single structure, such as shown, is preferred, however, as friction is thereby greatly reduced.

Both balls or weights are preferably introduced at the same time, so that their movement is coincident, each weight therefore in acting against the pitch of the helical guide or track overcoming the other and causing the force of gravity to be transmitted by said helical guides or tracks to the central stem 1 and transformed into rotary motion.

Having thus described my invention, I claim and desire to secure by Letters Patent—

1. A mechanical motor comprising a stem or shaft mounted so as to rotate, a helical track carried thereby and moving with said stem, and a freely-movable weight resting on said track and serving to rotate the stem or shaft, the track and weight partaking of such rotative movement.

2. A mechanical motor comprising a stem or shaft mounted so as to rotate, helical tracks carried thereby and moving with said stem, and freely-movable weights mounted upon said tracks and exerting their power thereon to rotate the stem or shaft, the tracks and weights partaking of such rotative movement.

3. A mechanical motor comprising a stem or shaft mounted so as to rotate, helical tracks carried by said stem, said tracks having their pitch disposed toward the axis of rotation and moving with said stem, and weights adapted to move along and with said tracks and rotate the stem or shaft, the tracks and weights partaking of such rotative movement.

4. A mechanical motor comprising a stem or shaft mounted so as to rotate, a pair of helical tracks carried by said stem or shaft and disposed opposite each other with their pitch inclined toward the axis of rotation, and weights adapted to said tracks, said weights in moving tending to displace the helical tracks and thereby rotate the stem or shaft carrying the same.

5. A mechanical motor comprising a stem or shaft mounted so as to rotate, a pair of helical tracks carried by said stem or shaft and disposed opposite each other with their pitch inclined toward the axis of rotation, said tracks having concaved faces, and weights adapted to move along said tracks, said weights tending to displace the helical tracks and thereby rotate the stem or shaft carrying the same.

In testimony whereof I have signed my name to this specification in the presence of two subscribing witnesses.

CHARLES DACKIEWICZ.

Witnesses:
WILLIAM E. BRADLEY,
JOS. H. KLEIN.